United States Patent
Han et al.

(10) Patent No.: US 6,959,704 B2
(45) Date of Patent: Nov. 1, 2005

(54) GRILL UNIT AND COOKING APPARATUS WITH THE SAME

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-yeong Yeo, Hwasung (KR); Han-Seong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/706,926

(22) Filed: Nov. 14, 2003

(65) Prior Publication Data

US 2004/0154605 A1 Aug. 12, 2004

(30) Foreign Application Priority Data

Feb. 6, 2003 (KR) ................................. 10-2003-0007564

(51) Int. Cl.[7] ............................................. A47J 37/006
(52) U.S. Cl. ....................... 126/33; 126/39 R; 126/41 R
(58) Field of Search ......................... 126/33, 369–369.3, 126/373.1, 384.1, 39 R, 41 R; 99/339, 416, 448, 450

(56) References Cited

U.S. PATENT DOCUMENTS

| | | | | |
|---|---|---|---|---|
| 1,330,209 A | * | 2/1920 | Massing | 99/347 |
| 1,939,715 A | * | 12/1933 | Meitzler | 422/300 |
| 2,590,942 A | * | 4/1952 | Carroll | 99/347 |
| 2,664,221 A | * | 12/1953 | Edward | 220/212 |
| 2,715,898 A | * | 8/1955 | Michaelis et al. | 126/273 R |

(Continued)

FOREIGN PATENT DOCUMENTS

| | | | |
|---|---|---|---|
| FR | 2 670 274 | | 6/1992 |
| FR | 2 724 833 | | 3/1996 |
| GB | 2 286 111 | | 8/1995 |
| JP | 08-200939 | * | 8/1996 |
| JP | 10-2932119 | * | 11/1998 |

OTHER PUBLICATIONS

Patent Abstract of KR 16089 dated Mar. 4, 2002.
Patent Abstracts of Japan Publication No. 2000–166771 dated Jun. 20, 2000.
Patent Abstract of Japan Publication No. 03–026216 dated Feb. 4, 1991.
Korean Patent Abstract Publication No. 2002–16089, Published Mar. 4, 2002.

(Continued)

*Primary Examiner*—Carl D. Price
(74) *Attorney, Agent, or Firm*—Staas & Halsey LLP

(57) ABSTRACT

A grill unit and a cooking apparatus having the grill unit, the grill unit including a plurality of grill pipes; water tanks connected to ends of the grill pipes to supply water into the grill pipes; covers to selectively open and close upper portions of the water tanks; and guide members respectively extending from inner surfaces of the covers toward insides of the water tanks to guide condensed water formed on the inner surfaces of the covers into the water tanks. The grill unit prevents water condensed on inner surfaces of the covers of the water tanks of the grill unit from flowing out of the water tanks.

6 Claims, 4 Drawing Sheets

U.S. PATENT DOCUMENTS

| | | | |
|---|---|---|---|
| 3,152,242 A | | 10/1964 | De Mott |
| 3,154,004 A | | 10/1964 | Huck |
| 3,371,659 A | | 3/1968 | Paspalas |
| 3,609,297 A | * | 9/1971 | Christopoulos ............. 219/439 |
| 3,754,116 A | * | 8/1973 | Godel ........................ 219/222 |
| 3,780,642 A | * | 12/1973 | Bay ............................ 99/347 |
| 4,373,511 A | * | 2/1983 | Miles et al. ................ 126/369 |
| 4,508,024 A | | 4/1985 | Perkins |
| 4,893,609 A | | 1/1990 | Giordani et al. |
| 5,189,945 A | * | 3/1993 | Hennick ....................... 99/339 |
| 5,387,781 A | * | 2/1995 | Berkoff ....................... 219/735 |
| 5,535,733 A | | 7/1996 | Hait |
| 5,613,451 A | * | 3/1997 | Zook ..................... 110/173 R |
| 5,613,618 A | * | 3/1997 | Raoult ........................ 220/369 |
| 6,125,838 A | | 10/2000 | Hedgpeth |
| 6,293,276 B1 | | 9/2001 | Owens et al. |

OTHER PUBLICATIONS

U.S. Appl. No. 10/736,836, filed Dec. 17, 2003, Han et al., Samsung Electronics Co. Ltd.

U.S. Appl. No. 10/659,380, filed Sep. 11, 2003, Han et al., Samsung Electronics Co. Ltd.

U.S. Appl. No. 10/681,132, filed Oct. 9, 2003, Han et al., Samsung Electronics Co. Ltd.

U.S. Appl. No. 10/681,136, filed Oct. 9, 2003, Han et al., Samsung Electronics Co. Ltd.

U.S. Appl. No. 10/682,548, filed Oct. 10, 2003, Han et al., Samsung Electronics Co. Ltd.

U.S. Appl. No. 10/687,603, filed Oct. 20, 2003, Han et al., Samsung Electronics Co. Ltd.

U.S. Appl. No. 10/689,746, filed Oct. 22, 2003, Han et al., Samsung Electronics Co. Ltd.

U.S. Appl. No. 10/691,551, filed Oct. 24, 2003, Han et al., Samsung Electronics Co. Ltd.

U.S. Appl. No. 10/705,893, filed Nov. 13, 2003, Han et al., Samsung Electronics Co. Ltd.

U.S. Appl. No. 10/731,159, filed Nov. 17, 2003, Han et al., Samsung Electronics Co. Ltd.

European Search Report for corresponding application EP 03255738 dated Nov. 5, 2003.

Patent Abstract of Japan No. 2002–254007 dated Sep. 19, 2000.

Patent Abstract of Japan No. 2001–120440 dated May 8, 2001.

Patent Abstract of Japan No. 11–267032 dated Oct. 5, 1999.

* cited by examiner

GRILL UNIT AND COOKING APPARATUS WITH THE SAME

CROSS-REFERENCE TO RELATED APPLICATIONS

This application claims the benefit of Korean Application No. 2003-7564, filed Feb. 6, 2003, in the Korean Intellectual Property Office, the disclosure of which is incorporated herein by reference.

BACKGROUND OF THE INVENTION

1. Field of the Invention

The present invention relates, in general, to a grill unit and cooking apparatus with the same and, more particularly, to a grill unit and cooking apparatus with the same, which prevents water condensed on covers of water tanks of the grill unit from flowing out of the water tanks.

2. Description of the Related Art

Generally, it is well known that meat or processed meat, such as sausage, is most delicious when grilled. Therefore, persons enjoy cooking meat or processed meat using a cooking apparatus with a grill unit and eating the cooked meat or processed meat.

The cooking apparatus for this kind of cooking includes a heating unit for directly applying heat to food, and a grill unit mounted on top of the heating unit to support food while spacing the food apart from the heating unit. This structure allows food put on the grill unit to be heated by heat transferred from the heating unit. However, when cooking is performed using the cooking apparatus equipped with a grill unit, high temperature heat is directly transferred from the heating unit to the grill unit, so the part of food in contact with the grill unit easily burns, thus deteriorating the taste of the food and negatively affecting the health of those eating the burned food.

SUMMARY OF THE INVENTION

It is an aspect of the present invention to provide a grill unit and cooking apparatus with the same, which prevents water condensed on inner surfaces of covers of water tanks of the grill unit from flowing out of the water tanks.

Additional aspects and/or advantages of the invention will be set forth in part in the description that follows and, in part, will be obvious from the description, or may be learned by practice of the invention.

To achieve the above and/or other aspects of the present invention, there is provided a grill unit including a plurality of grill pipes; water tanks connected to ends of the grill pipes to supply water into the grill pipes; covers to selectively open and close upper portions of the water tanks; and guide members respectively extending from inner surfaces of the covers toward insides of the water tanks to guide condensed water formed on the inner surfaces of the covers into the water tanks.

Each cover has sides with connecting parts at a back of each side to hingedly connect each cover to upper portions of the water tanks, respectively, and each guide member is located at a lower portion of the inner surface of each cover, respectively, adjacent to the connecting parts.

The covers, when closed, are downwardly sloped toward the guide members to allow condensed water formed on the inner surfaces of the covers to flow down toward the guide members.

The covers are sloped in any one direction to allow condensed water formed on the inner surfaces of the covers to flow down.

To achieve the above and/or other aspects of the present invention, there is provided a cooking apparatus with a grill unit, including a cabinet having at least one heater to heat food; and a grill unit mounted on a top surface of the cabinet to support the food, the grill unit including a plurality of grill pipes, water tanks connected to ends of the grill pipes to supply water into the grill pipes, covers to selectively open and close open upper portions of the water tanks, and guide members respectively extending from inner surfaces of the covers toward insides of the water tanks to guide condensed water formed on the inner surfaces of the covers into the water tanks.

To achieve the above and/or other aspects according to the present invention, there is provided a cover for a water tank of a grill unit of a cooking apparatus, the water tank being connected to grill pipes to supply water into the grill pipes, the cover including connecting parts at backs of respective sides of the cover to hingedly connect the cover to an upper portion of the water tank, the connection parts allowing the cover to be rotatably opened and closed; and a guide member connected to a lower portion of the inner surface of the cover and extending from the inner surface of the cover a predetermined distance toward the inside of the water tank to guide condensed water formed on the inner surface of the cover into the water tank.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENT

Figure 1:
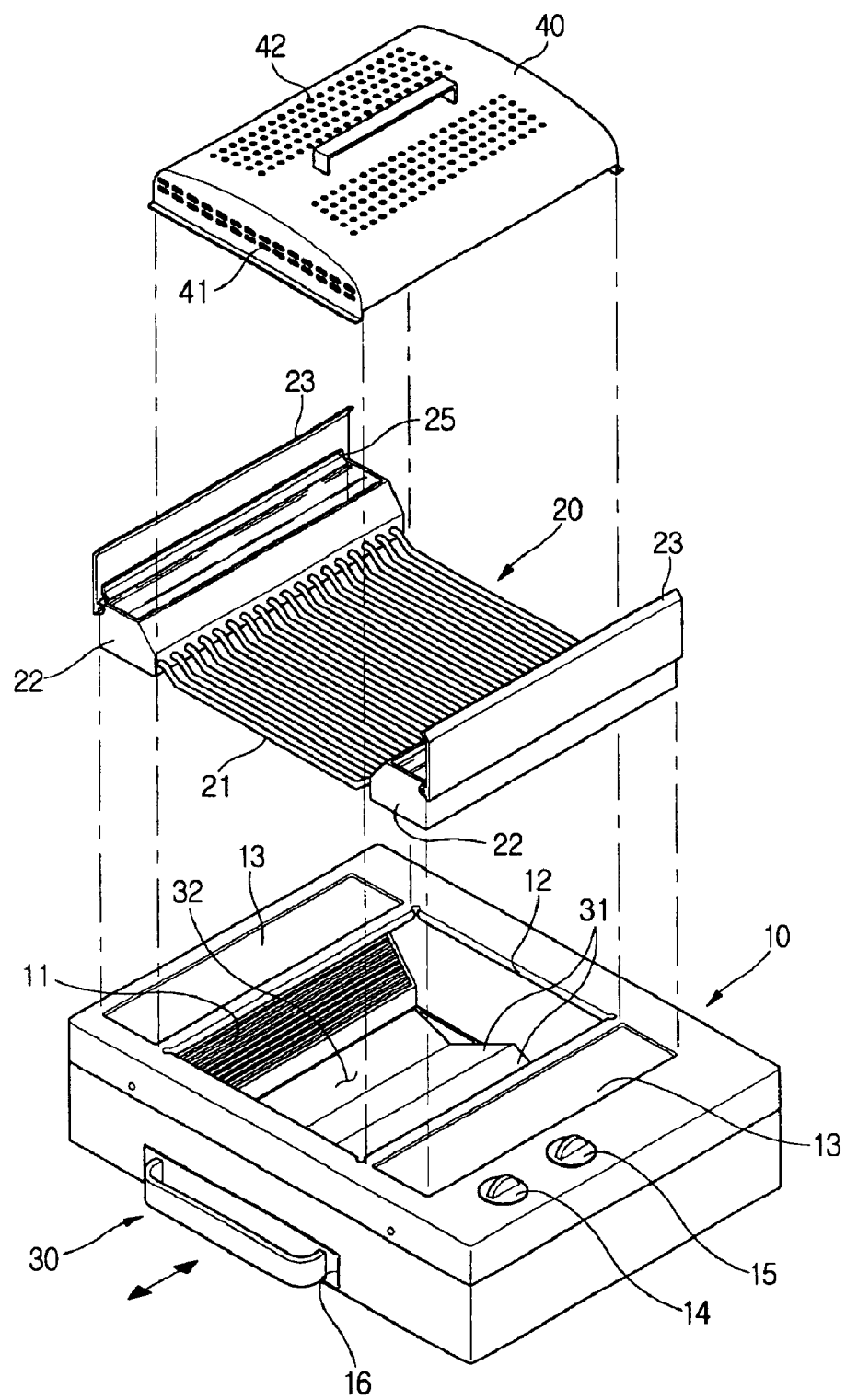
FIG. 1 is an exploded perspective view of a cooking apparatus with a grill unit according to the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

As shown in FIG. 1, a cooking apparatus with a grill unit according to the present invention includes a cabinet 10 formed in a box shape, and a grill unit 20 mounted on a top of the cabinet 10 to grill food put on the grill unit 20. Further, the cooking apparatus includes a plurality of heaters 11 mounted in the cabinet 10 to heat food put on the grill unit 20, a heat reflecting member 30 that guides the heat from the heaters 11 to the food on the grill unit 20 and collects oil dripping from the food, and a cover member 40 that covers the upper portion of the grill unit 20 and has a plurality of holes 41 and 42 perforated therethrough.

The cabinet 10 has an opening 12 formed in the top thereof to allow heat generated by the heaters 11 mounted in the cabinet 10 to be transferred to the grill unit 20. Grill seats 13, each with a predetermined area, are formed on both sides of the top surface of the cabinet 10 around the opening 12 to allow the grill unit 20 to be seated thereon. Further, a timer switch 14 and a power switch 15 are provided at a certain portion of a top surface of the cabinet 10 to control the heating time and the heating temperature of the heaters 11, respectively. An opening 16 is formed in a lower portion of the front of the cabinet 10 so that the heat reflecting member 30 may be moved into and out of the cabinet 10 through the opening 16, similar to the operation of a drawer.

The heaters 11 are set within both sides of the cabinet 10, that is, below the grill seats 13, to heat food put on the grill unit 20, and are inclined at a predetermined angle such that heating surfaces of the heaters 11 face the opening 12 formed in the top of the cabinet 10. The heaters 11 each include a ceramic member in which heating elements are encapsulated to generate infrared rays with a high temperature. However, the heaters 11 may be implemented as gas heaters using gas, or as trays for holding charcoal.

The heat reflecting member 30 is constructed such that its axial center portion is projected upward to form a hill shape with a triangular cross-section, and both projected surfaces form reflecting surfaces 31 to allow heat generated by the heaters 11 to be reflected to the grill unit 20 arranged above the heaters 11. Further, recesses 32 are formed at bottoms of both projected surfaces to collect oil dripping from food put on the grill unit 20. Further, although not shown in FIG. 1, a predetermined amount of water is contained in the heat reflecting member 30 to prevent the temperatures of the recesses 32 and the reflecting surfaces 31 from increasing excessively, thus preventing oil collected in the recesses 32 from burning or adhering to the recesses 32.

The grill unit 20 includes a plurality of grill pipes 21 arranged in parallel with each other while being spaced apart from each other, water tanks 22 connected to both side ends of the grill pipes 21 to supply water into the grill pipes 21 and provided with bottom surfaces seated on the grill seats 13 of the top surface of the cabinet 10, and covers 23 to selectively open and close upper portions of the water tanks 22.

Figure 2:
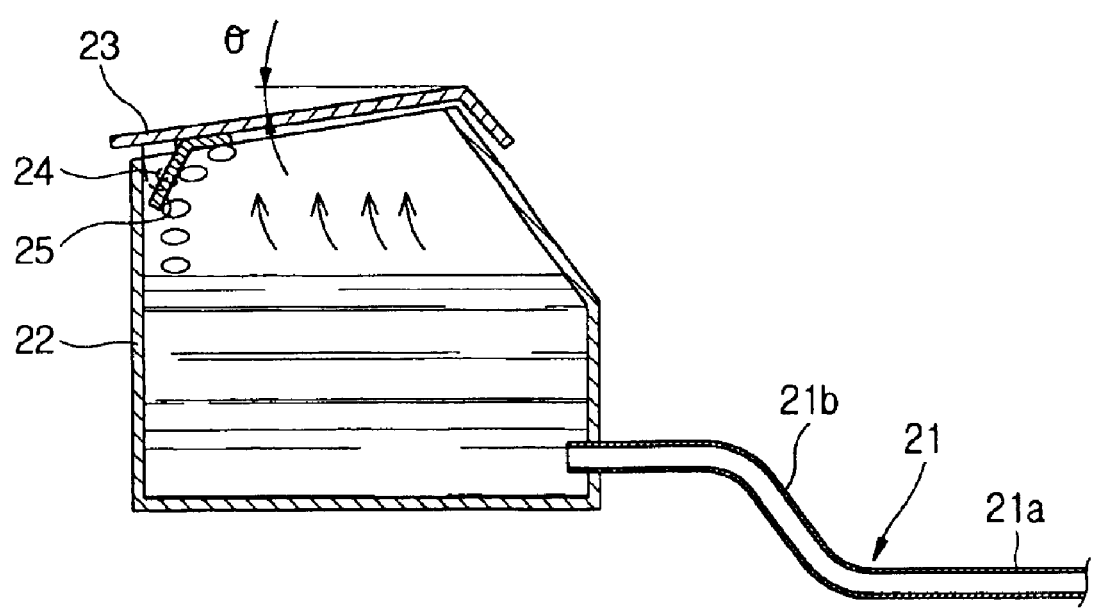
FIG. 2 is a sectional view of a water tank of the grill unit of the present invention with a cover being closed.

As shown in FIG. 2, each of the grill pipes 21 is provided with a horizontally extended part 21a on which food is placed. The horizontally extended part 21a is bent to be positioned lower than both side ends of each of the grill pipes 21 connected to the water tanks 22 so that the food is positioned near the heaters 11 arranged below the food. That is, the grill pipe 21 is provided with two inclined parts 21b downwardly bent at a predetermined angle and extended from end parts connected to the water tanks 22. Each of the grill pipes 21 is bent to be horizontally extended between the inclined parts 21b, so that the horizontally extended part 21a on which the food is placed is lower than the water tanks 20.

The above-described construction of the grill unit 20 prevents the grill pipes 21 from overheating by allowing water to flow into the grill pipes 21 from the water tanks 22, even though the grill pipes 21 are heated by heat transferred from the heaters 11 arranged below the grill unit 20 when the user grills food, thereby preventing the part of food in contact with the grill pipes 21 from burning.

Figure 4:
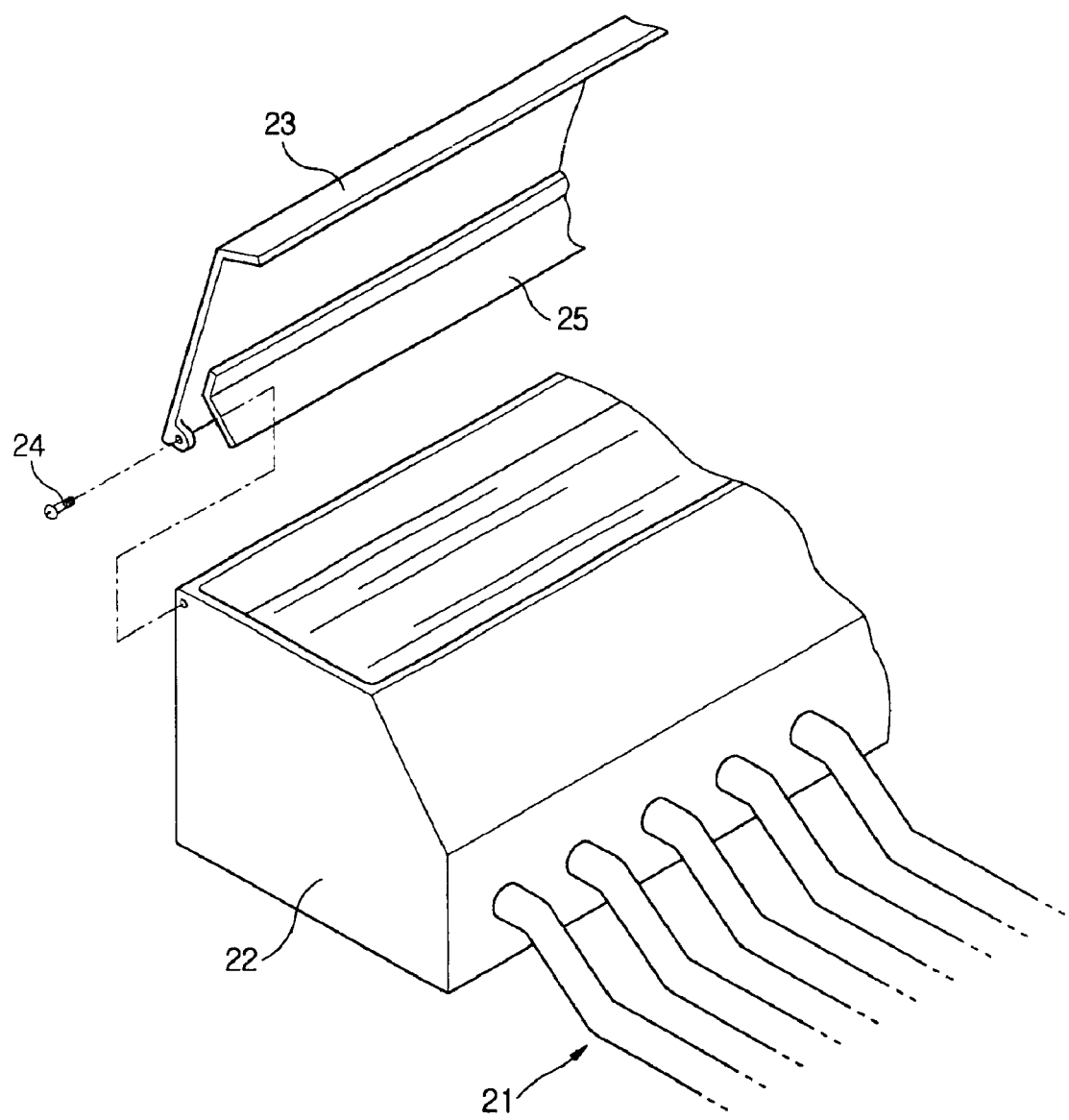
FIG. 4 is a perspective view showing the construction of the water tank and the cover of the grill unit of the present invention.

As shown in FIGS. 2 and 4, one side of the cover 23 of the water tank 22 hingedly connects to the upper portion of the water tank 22 through a hinge pin 24 so that the cover 23 rotatably opens and closes. Further, a guide member 25 attached to the inner surface of the cover 23 guides water condensed from water vapor formed on the inner surface of the cover 23 into the water tank 22. The guide member 25 extends in the longitudinal direction of the cover 23 and bends a predetermined distance to face an inside of the water tank 22, with one end thereof being connected to the inner surface of the cover 23.

Further, as shown in FIG. 2, the cover 23 is sloped a predetermined angle θ when closed to allow condensed water formed on the inner surface of the cover 23 to flow down. The guide member 25 is attached to the lower portion of the inner surface of the cover 23. In one instance, the cover 23 is downwardly sloped toward the hingedly connected part so that the condensed water formed on the inner surface of the cover 23 flows down to the hingedly connected part of the cover 23. The guide member 25 is provided on a lower portion of the inner surface of the cover 23 near the hingedly connected part.

As shown in FIG. 2, condensed water formed on the inner surface of the cover 23 spontaneously flows to the guide member 25 along the inner surface of the inclined cover 23 when cooking, and the condensed water falls down into the water tank 22 by the guide member 25, thus preventing the condensed water formed on the cover 23 from flowing out of the water tank 22.

Figure 3:
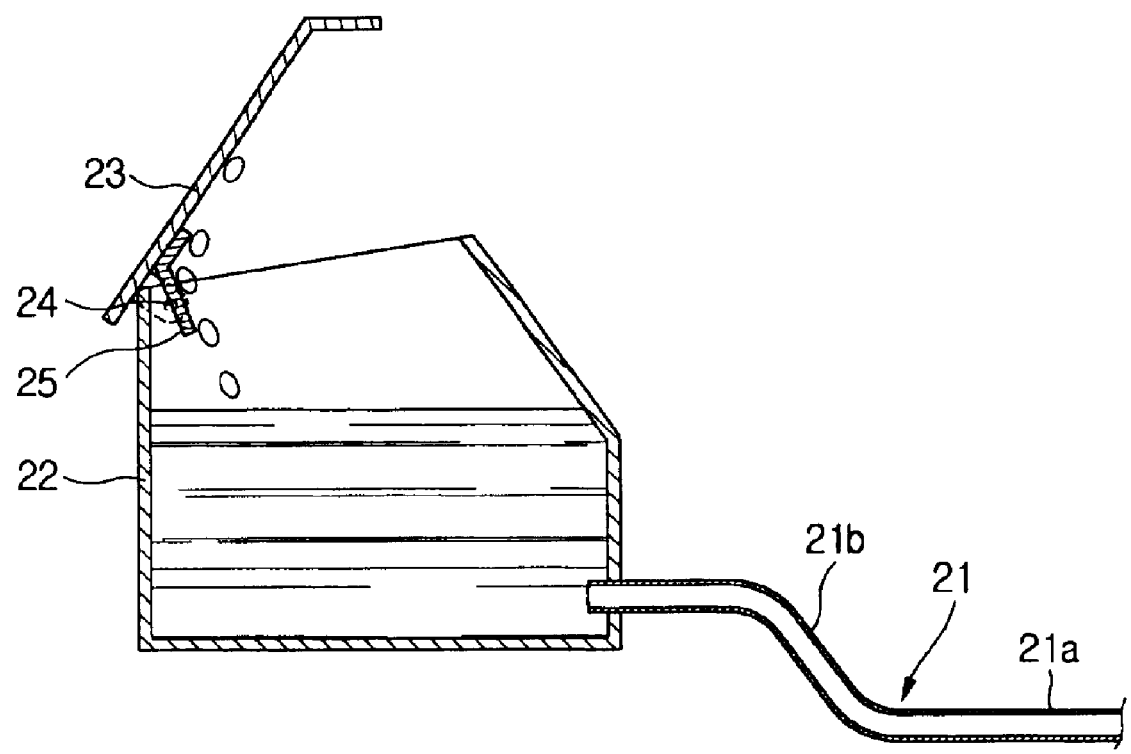
FIG. 3 is a sectional view of the water tank of the grill unit of the present invention with the cover being opened.

Further, as shown in FIG. 3, condensed water formed on the inner surface of the cover 23 is guided into the water tank 22 using the guide member 25, even when a user rotates and opens the cover 23.

As is apparent from the above description, the present invention provides a grill unit and cooking apparatus with the same, in which covers of water tanks of the grill unit are downwardly sloped toward hingedly connected parts, and guide members that guide the flow of condensed water are provided on lower portions of the inner surfaces of the covers near the hingedly connected parts, thus preventing the condensed water on the inner surfaces of the covers from flowing out of the water tanks.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A grill unit, comprising:
    a plurality of grill pipes;
    water tanks connected to ends of the grill pipes to supply water into the grill pipes;
    covers to selectively open and close upper portions of the water tanks; and
    guide members respectively extending from inner surfaces of the covers toward insides of the water tanks to guide condensed water formed on the inner surfaces of the covers into the water tanks.
    wherein the covers, when closed, are downwardly sloped toward the guide members to allow condensed water formed on the inner surfaces of the covers to flow down toward the guide members, and each of the grill pipes has an extended part positioned between inclined parts connected with the water tanks, so that the extended part, on which food is placed, is lower than the water tanks.

2. The grill unit according to claim 1, wherein each cover has sides with connecting parts at a back of each side to hingedly connect each cover to upper portions of the water tanks, respectively, and each guide member is located at a lower portion of the inner surface of each cover, respectively, adjacent to the connecting parts.

3. The grill unit according to claim 1, wherein the covers are sloped in any one direction to allow condensed water formed on the inner surfaces of the covers to flow down.

4. A cooking apparatus, comprising:
a cabinet having at least on heater to heat food; and
a grill unit mounted on a top surface of the cabinet to support the food, the grill unit comprising:
a plurality of grill pipes,
water tanks connected to ends of the grill pipes to supply water into the grill pipes,
covers to selectively open and close open upper portions of the water tanks, and
guide members respectively extending from inner surfaces of the covers toward insides of the water tanks to guide condensed water formed on the inner surfaces of the covers into the water tanks, wherein the covers, when closed, are downwardly sloped toward the guide members to allow condensed water formed on the inner surfaces of the covers to flow down toward the guide members, and each of the grill pipes has a extended part positioned between inclined parts connected with the water tanks, so that the extended part, on which the food is placed, is lower than the water tanks.

5. The cooking apparatus according to claim 4, wherein each cover has sides with connecting parts at a back of each side to hingedly connect each cover to upper portions of the water tanks, respectively, and each guide member is located at a lower portion of the inner surface of each cover, respectively, adjacent to the connecting parts.

6. The cooking apparatus according to claim 4, wherein the covers are sloped in any one direction to allow condensed water formed on the inner surfaces of the covers to flow down.

* * * * *

UNITED STATES PATENT AND TRADEMARK OFFICE
CERTIFICATE OF CORRECTION

PATENT NO. : 6,959,704 B2 Page 1 of 1
APPLICATION NO. : 10/706926
DATED : November 1, 2005
INVENTOR(S) : Dae-Sung Han et al.

It is certified that error appears in the above-identified patent and that said Letters Patent is hereby corrected as shown below:

Column 4, line 65, Claim 1, replace "tanks." with --tanks,--, therefor;

Column 5, line 18, Claim 4, replace "on" with --one--, therefor;

Column 6, line 10, Claim 4, replace "a" with --an--, therefor.

Signed and Sealed this

Twenty-fifth Day of July, 2006

JON W. DUDAS
*Director of the United States Patent and Trademark Office*